United States Patent

Nagai et al.

[11] Patent Number: 5,809,831
[45] Date of Patent: Sep. 22, 1998

[54] ELECTRIC ACTUATOR

[75] Inventors: Shigekazu Nagai; Shuuzou Sakurai, both of Ibaraki-ken, Japan

[73] Assignee: SMC Kabushiki Kaisha, Tokyo, Japan

[21] Appl. No.: 679,119

[22] Filed: Jul. 12, 1996

[30] Foreign Application Priority Data

Oct. 3, 1995 [JP] Japan .................................. 7-256414

[51] Int. Cl.⁶ .................................................. F16H 25/20
[52] U.S. Cl. .................... 74/89.15; 74/499; 74/424.8 R; 310/112
[58] Field of Search .................................. 74/89.15, 441, 74/499, 424.8 R, 424.8 VA; 310/83

[56] References Cited

U.S. PATENT DOCUMENTS

| | | | |
|---|---|---|---|
| 2,860,266 | 11/1958 | Schrader | 310/112 |
| 3,153,948 | 10/1964 | Adams | 74/499 |
| 3,606,801 | 9/1971 | Williams | 74/424.8 |
| 3,682,283 | 8/1972 | Sato et al. | |
| 4,082,247 | 4/1978 | Dalton | 74/424.8 VA |
| 4,635,491 | 1/1987 | Yamano et al. | |
| 4,739,669 | 4/1988 | Yokose et al. | |
| 5,090,513 | 2/1992 | Bussinger | 74/89.15 |
| 5,269,343 | 12/1993 | Trapp | 74/424.8 VA |
| 5,346,045 | 9/1994 | Bennett et al. | 74/89.15 |
| 5,488,880 | 2/1996 | Sartorio | 74/89.15 |
| 5,673,591 | 10/1997 | Kimura et al. | 74/89.15 |

FOREIGN PATENT DOCUMENTS

| | | |
|---|---|---|
| 0 601 185 A1 | 6/1994 | European Pat. Off. . |
| 2 088 239 | 1/1972 | France . |
| 2 587 690 | 3/1987 | France . |
| 2 641 424 | 7/1990 | France . |
| 92 12 073.3 | 12/1992 | Germany . |
| 1 352 078 | 5/1974 | United Kingdom . |

*Primary Examiner*—Charles A. Marmor
*Assistant Examiner*—David M. Fenstermacher
*Attorney, Agent, or Firm*—Oblon, Spivak, McClelland, Maier & Neustadt, P.C.

[57] ABSTRACT

An electric actuator includes a hollow actuator housing, an electric motor connected to the hollow actuator housing, a feed screw shaft coupled to the drive shaft of the electric motor, for transmitting rotational drive power from the electric motor, and a spline tube disposed in the hollow actuator housing in surrounding relationship to the feed screw shaft and held in engagement with the feed screw shaft, for displacement axially with respect to the hollow actuator housing with the rotational drive power transmitted by the feed screw shaft. Since the feed screw shaft is surrounded by the spline tube, dust and dirt particles are prevented from being deposited on the feed screw shaft.

10 Claims, 5 Drawing Sheets

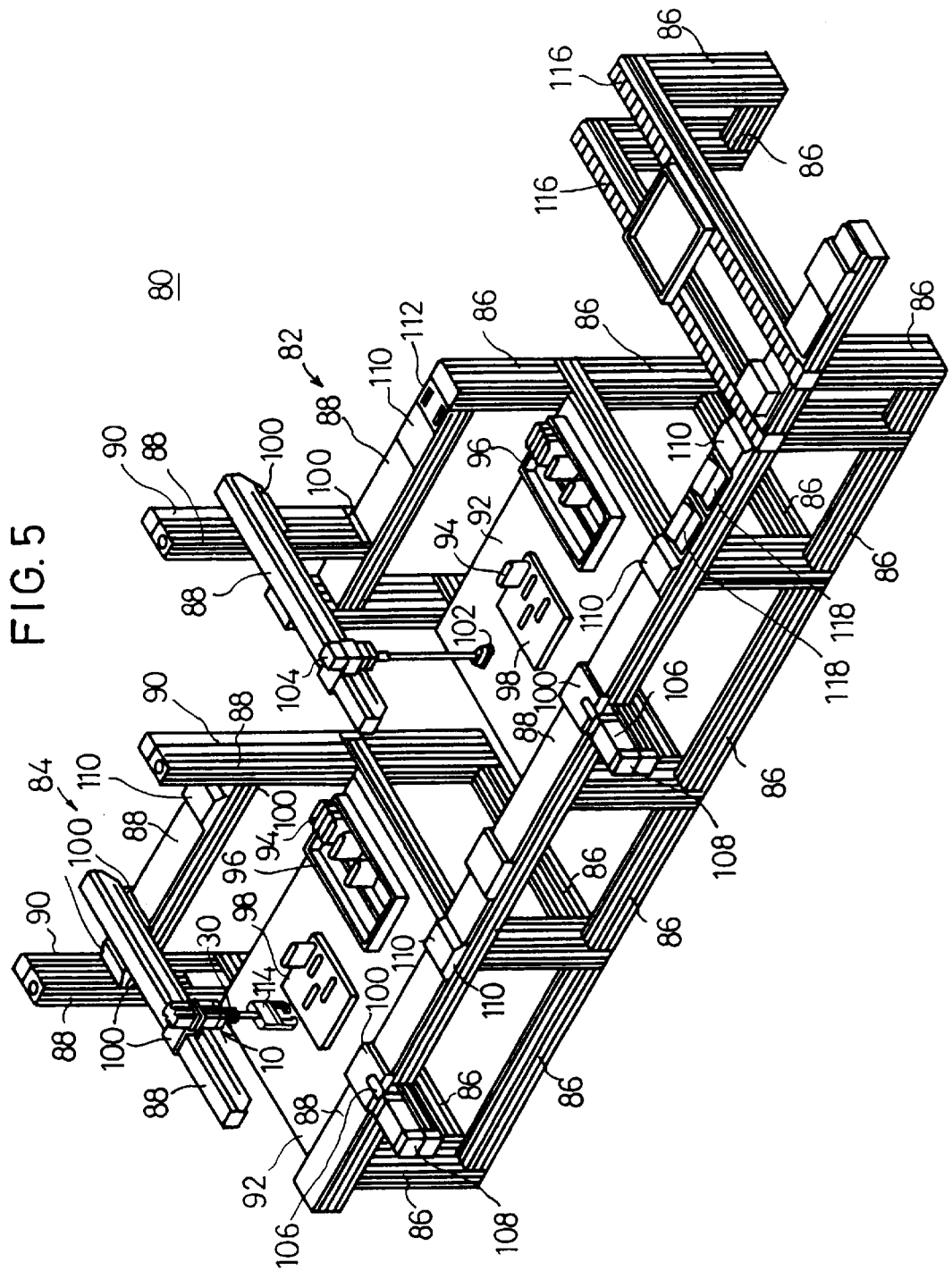

ELECTRIC ACTUATOR

BACKGROUND OF THE INVENTION

1. Field of the Invention

The present invention relates to an electric actuator for transmitting the rotational drive power from a rotational drive power source through a rotational drive power transmitting means to a displaceable member to convey a workpiece or the like.

2. Description of the Related Art

Electric actuators have heretofore been used to convey some workpieces. One conventional electric actuator comprises an elongate frame as an actuator housing which has an opening, an electric motor fixedly mounted in the frame. The electric motor has a motor shaft coaxially coupled by a coupling to a ball screw which transmits the rotational drive power from the motor shaft to another member.

The frame has a slot defined axially therein, and the opening of the frame is closed by a cover. The electric actuator also has a bearing block threaded over the ball screw for displacement along the slot upon rotation of the ball screw, and a table joined to the bearing block for reciprocating movement along the axis of the frame in unison with the bearing block.

The conventional electric actuator is, however, disadvantageous in that since bearing block projects out of the cover through the slot, dust and dirt particles find their way into the frame through the gap between the bearing block and the edge of the slot, and tend to be deposited on the ball screw. The deposited dust and dirt particles are likely to impair the ability of the ball screw to transmit the rotational drive power from the motor shaft, resulting in a failure to smoothly reciprocate the table.

SUMMARY OF THE INVENTION

It is a general object of the present invention to provide an electric actuator which is arranged to prevent dust and dirt particles from being deposited on a drive power transmission shaft in an actuator housing for thereby allowing the rotational drive power from an electric motor to be transmitted smoothly through the drive power transmission shaft.

According to the present invention, the rotational drive power from a rotational drive power source is transmitted to a rotational drive power transmitting means to displace a displacing means in an actuator housing in an axial direction through threaded engagement between the displacing means and the rotational drive power transmitting means, for thereby conveying a workpiece mounted on the displacing means to a desired position. The rotational drive power transmitting means is surrounded by the displacing means, so that dust and dirt particles will not be deposited on the rotational drive power transmitting means.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 5 is a perspective view of a structural assembly which incorporates the electric actuator shown in FIGS. 1 through 3.

DETAILED DESCRIPTION OF THE PREFERRED EMBODIMENTS

Figure 1:
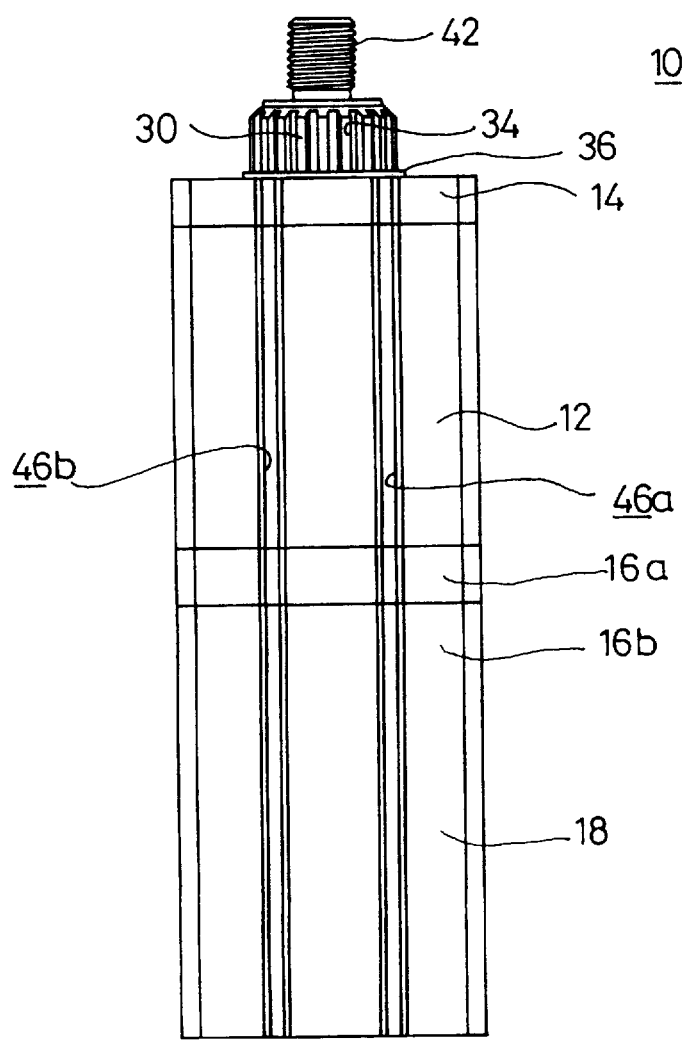
FIG. 1 is a front elevational view of an electric actuator according to an embodiment of the present invention.
Figure 3:
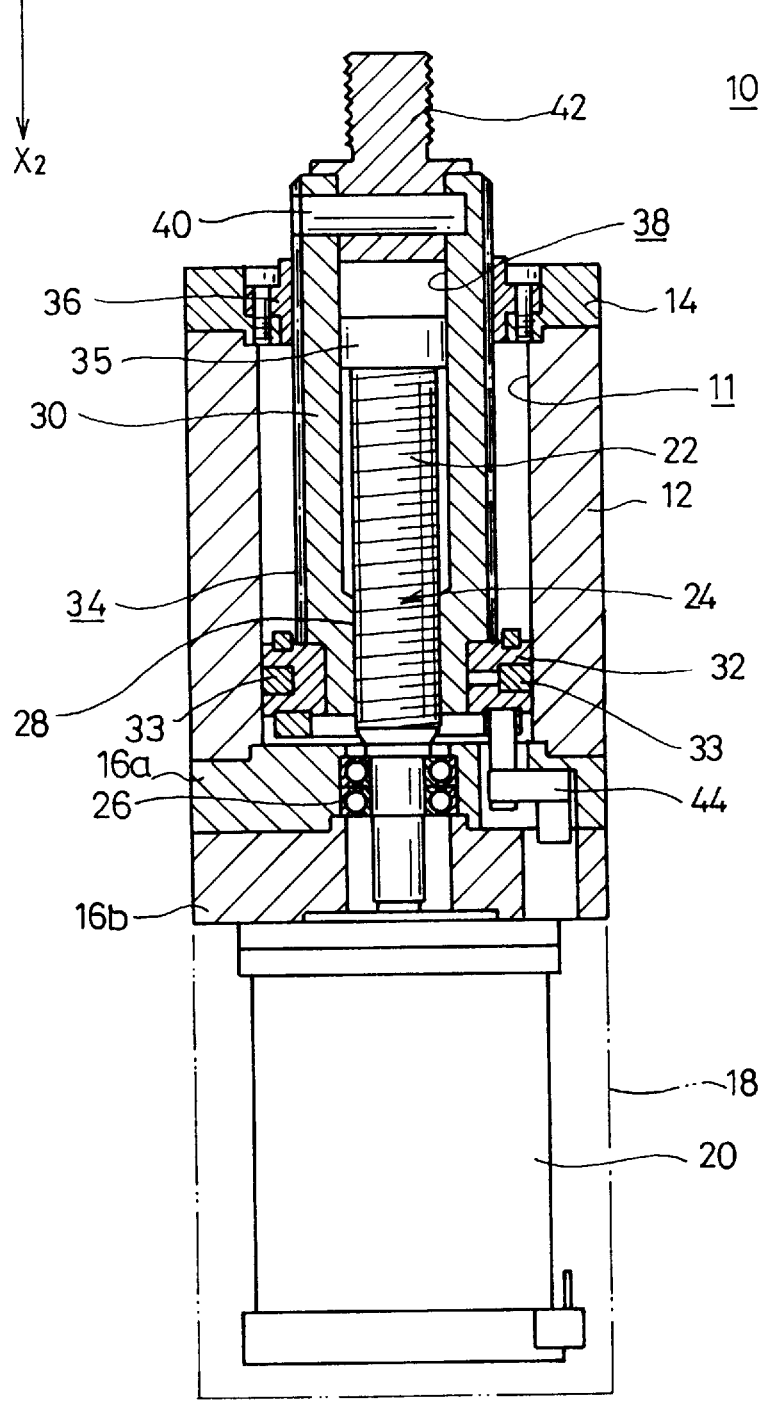
FIG. 3 is a partially cross-sectional view taken along line III—III of FIG. 2.

As shown in FIGS. 1 and 3, an electric actuator, generally designated by the reference numeral 10, according to an embodiment of the present invention comprises a hollow actuator housing 12 in the form of a hollow rectangular parallelepiped having a through hole 11 defined axially therethrough, an end block 14 fastened by screws to an end of the actuator housing 12, a cover 18 joined to the other end of the actuator housing 12 by joint blocks 16a, 16b and having side surfaces lying flush with side surfaces of the actuator housing 12, and an electric motor (rotational drive power source) 20 fixedly mounted in the cover 18.

The electric actuator 10 also has a feed screw shaft (rotational drive power transmitting means) 24 integrally formed coaxially with the motor shaft of the electric motor 20 and having an externally threaded outer circumferential surface 22, a bearing 26 fixed to the joint block 16a and supporting the feed screw shaft 24 rotatably therein, a substantially cylindrical spline tube (displacing means) 30 having an internally threaded inner circumferential surface 28 threaded over the externally threaded outer circumferential surface 22 and axially displaceable in the direction indicated by the arrow $X_1$ or $X_2$ upon rotation of the feed screw shaft 24 about its own axis, and a ring-shaped damper 32 fitted over an end of the spline tube 30. The ring-shaped damper 32 has an annular groove defined in an outer circumferential surface thereof and receiving a ring-shaped magnet 33. The ring-shaped magnet 33 supported on the ring-shaped damper 32 can be magnetically detected by a sensor (not shown) mounted in a sensor attachment groove (described later on) at any optional position therein for detecting the position of a workpiece which is held by a distal end of the spline tube 30.

The feed screw shaft 24 has a larger-diameter end 35, remote from the electric motor 20, fitted in sliding contact with the inner circumferential surface of a through hole (described later on) in the spline tube 30. The larger-diameter end 35 serves to prevent the spline tube 30 from being tilted with respect to and dislodged from the feed screw shaft 24 when the spline tube 30 is axially displaced with respect to the feed screw shaft 24.

The spline tube 30 has an outer circumferential splined with grooves 34 which prevent the spline tube 30 from being rotated around the feed screw shaft 24 in coaction with a boss 36 which engages in the grooves 34 and is fastened to the end block 14 by screws. The spline tube 30 has an axial through hole 38 defined therein whose one end is closed by a workpiece attachment 42 that is secured to an outer end of the spline tube 30 by a pin 40. The feed screw shaft 24 is surrounded by the spline tube 30 and also by the actuator housing 12 which is disposed around the spline tube 30. When the pin 40 is removed, the workpiece attachment 42 can be replaced with any of various other workpiece attachments having different shapes suitable for use with different types of workpieces.

A photomicroswitch 44, operating as a sensor for detecting the return of the spline tube 30 to its original position shown in FIG. 3, is disposed in the joint block 16a. When the photomicroswitch 44 detects a metal piece (not shown) connected to the damper 32, it detects the return of the spline tube 30 to its original position.

Figure 2:
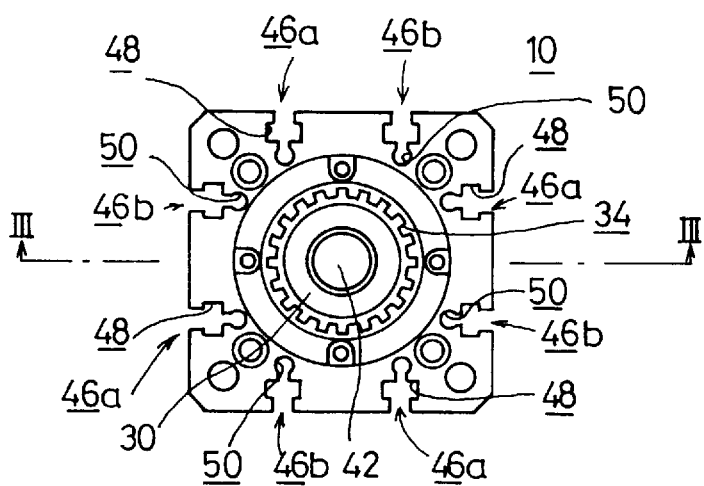
FIG. 2 is a plan view of the electric actuator shown in FIG. 1.

As shown in FIGS. 1 and 2, the actuator housing 12, the joint blocks 16a, 16b, and the cover 18 have jointly provide four side perpendicular surfaces each having two substantially parallel grooves 46a, 46b extending in the axial direction of the electric actuator 10. Each of the grooves 46a, 46b comprises an actuator mounting slot 48 of a substantially T-shaped cross section, which is open at the corresponding side surface of the actuator housing 12, for mounting the electric actuator 10 on a member through bolts (not shown), and a sensor attachment slot 50 of a substantially arcuate cross section contiguous to the actuator mounting slot 48 and extending away from the corresponding side surface of the actuator housing 12.

The electric actuator 10 of the above structure operates and offer various advantages as follows:

First, a workpiece to be conveyed by the electric actuator 10 is mounted on the workpiece attachment 42.

Then, a power supply connected to the electric actuator 10 is turned on to energize the electric motor 20, which applies its rotational drive power to the feed screw shaft 24 integral with the motor shaft. The spline tube 30 is now displaced in the direction indicated by the arrow $X_1$ because of the threaded engagement between the externally threaded outer circumferential surface 22 of the feed screw shaft 24 and the internally threaded inner circumferential surface 28 of the spline tube 30.

At this time, the grooves 34 defined in the outer circumferential surface of the spline tube 30 and kept in splined engagement with the boss 36 prevents the spline tube 30 from rotating with the feed screw shaft 24, and the damper 32 slides against the inner circumferential surface of the through hole 11 in the actuator housing 12 to guide the spline tube 30 as it is displaced in the direction indicated by the arrow $X_1$.

When the damper 32 fitted over the spline tube 30 abuts against the end block 14 upon displacement of the spline tube 30 in the direction indicated by the arrow $X_1$, the damper 32 operates as a stopper to stop the spline tube 30 at its stroke end position and also serves to absorb shocks produced when it hits the end block 14.

When the electric motor 20 is reversed by a switch (not shown), the spline tube 30 is displaced back from the stroke end position in the direction indicated by the arrow $X_2$ until it returns to the original position. The arrival at the original position of the spline tube 30 is detected by the photomicroswitch 44.

Since the feed screw shaft 24 integral with the motor shaft of the electric motor 20 is surrounded by the spline tube 30 and also by the actuator housing 12 which is disposed around the spline tube 30, the spline tube 30 and the actuator housing 12 provide a reliable double-walled shield around the feed screw shaft 24 for preventing dust and dirt particles outside of the actuator housing 12 from being deposited on the feed screw shaft 24.

Accordingly, any resistance to the sliding movement of the feed screw shaft 24 with respect to the spline tube 30 is not increased by dust and dirt particles which would otherwise be deposited on the feed screw shaft 24. The feed screw shaft 24, therefore, remains highly reliable and durable in its operation, and is capable of smoothly transmitting the rotational drive power from the electric motor 20 to the spline tube 30.

Figure 4:
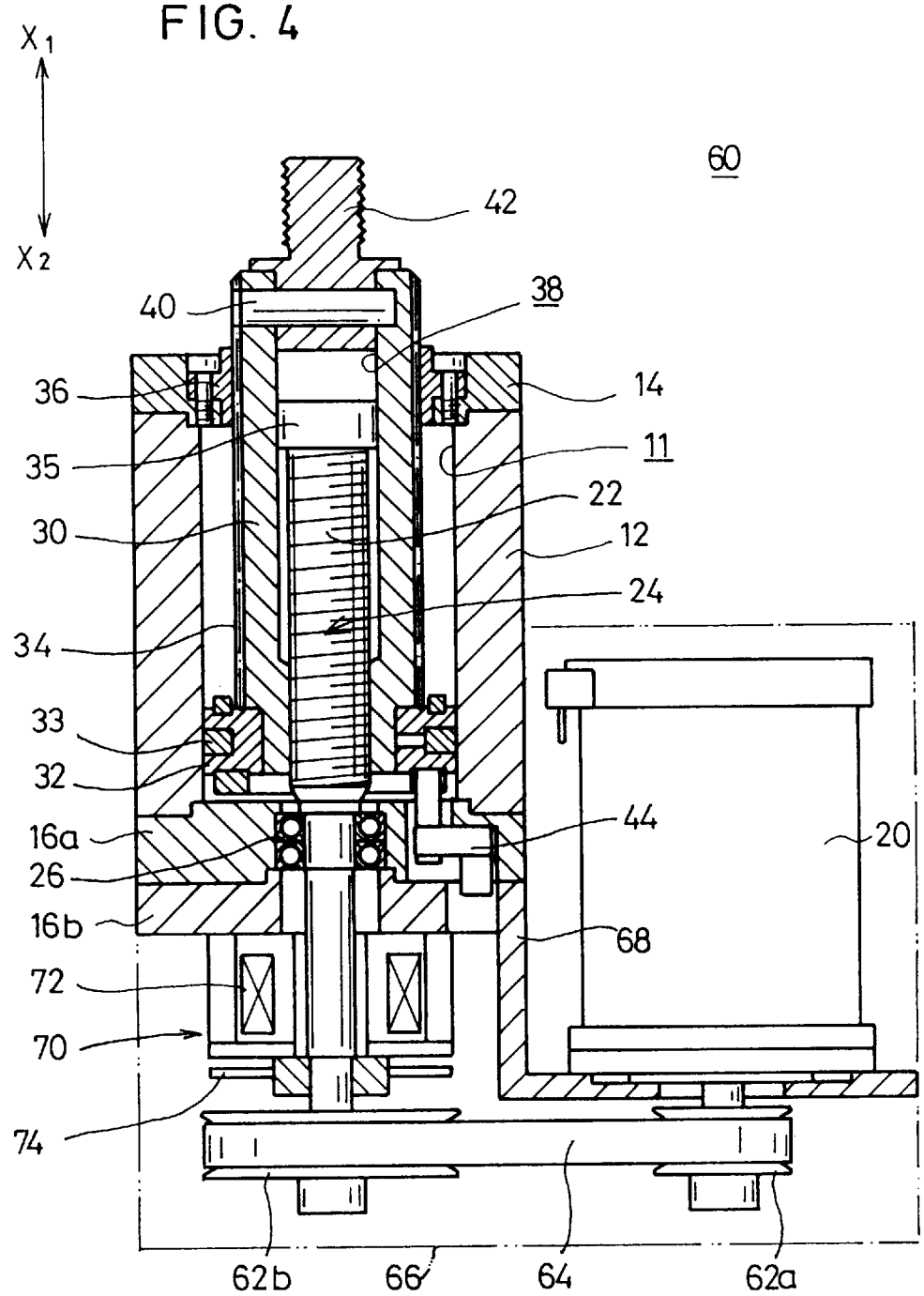
FIG. 4 is a partially cross-sectional view of an electric actuator according to another embodiment of the present invention.

FIG. 4 shows an electric actuator 60 according to another embodiment of the present invention. Those parts of the electric actuator 60 shown in FIG. 4 which are identical to those of the electric actuator 10 shown in FIG. 3 are denoted by identical reference numerals and will not be described in detail below.

The electric actuator 60 shown in FIG. 4 differs from the electric actuator 10 shown in FIG. 3 in that whereas the electric motor 20 and the feed screw shaft 24 are coaxially coupled in series to each other in the electric actuator 10 shown in FIG. 3, the electric actuator 60 shown in FIG. 4 has pulleys 62a, 62b connected respectively to the motor shaft of the electric motor 20 and the feed screw shaft 24, and the motor shaft and the feed screw shaft 24 extend parallel to each other in spaced-apart relationship and are operatively coupled to each other by a timing belt (drive power transmitting medium) 64 trained around the pulleys 62a, 62b.

The electric actuator 60 also has a cover 66 surrounding the electric motor 20 and the feed screw shaft 24 which are disposed parallel to each other, and a support plate 68 fixed the joint block 16b and supporting the electric motor 20.

The electric actuator 60 also has an electromagnetic brake mechanism 70 mounted on an end of the feed screw shaft 24 near the pulley 62b. The electromagnetic brake mechanism 70 comprises a coil 72 disposed around the feed screw shaft 24 and supported on the joint block 16b and a disk 74 secured to the feed screw shaft 24 axially adjacent to the coil 72. The disk 74 can be held in position when the coil 72 is energized. When the coil 72 is not energized, the electromagnetic brake mechanism 70 applies a brake to prevent the feed screw shaft 24 from rotating. When the coil 72 is energized, the electromagnetic brake mechanism 70 releases a brake from the feed screw shaft 24. If the electric actuator 60 is used in a vertical position as shown with the workpiece attachment 42 oriented in the direction indicated by the arrow $X_1$, then the electromagnetic brake mechanism 70 serves to prevent the workpiece from dropping. The electromagnetic brake mechanism 70 may be incorporated in the electric actuator 10 shown in FIG. 3.

The electric actuator 60 shown in FIG. 4 operates in the same manner and offers the same advantages as the electric actuator 10 shown in FIG. 3.

FIG. 5 shows a structural assembly 80 which incorporates the electric actuator 10 shown in FIGS. 1 through 3.

As shown in FIG. 5, the structural assembly 80 basically comprises a first section 82 and a second section 84 which are disposed in juxtaposed relationship to each other. The first and second sections 82, 84 process workpieces differently as the workpieces are conveyed by the electric actuators in the first and second sections 82, 84.

Each of the first and second sections 82, 84 comprises a plurality of columnar members 86 which make up an assembly skeleton, a plurality of actuators 88 including an electric actuators, a plurality of air balancers 90 associated with the actuators 88, a working table 92, a plurality of workpieces 94, a workpiece storage box 96, a workpiece holder plate 98, a plurality of mobile bodies 100, and a positioning cylinder 108 with a projecting cylinder rod 106.

The first section 82 includes a cylinder 104 to which there is connected a suction pad 102 for gripping a workpiece 94. The first section 82 also has motor boxes 110 and display units 112 which are disposed at ends of some of the actuators 88 and have upper surfaces lying flush with the upper surfaces of these actuators 88. Since the upper surfaces of the motor boxes 110 and the display units 112 lie flush with the upper surfaces of the actuators 88 with which they are associated, the motor boxes 110 and the display units 112 provide compatibility for installation of the actuators 88 on other members, and allow an installation space to be effectively utilized due to their being relatively compact.

The second section 84 also has motor boxes 110 which are disposed at ends of some of the actuators 88. These motor boxes 110 may have their upper surfaces lying flush with the upper surfaces of these actuators 88. In the second section 84, the air balancers 90 associated with the actuators 88 are disposed vertically in confronting relationship to each other, and ends of the actuators 88 are connected to the actuators 88 associated with the air balancers and the mobile bodies 100. The actuators 88 to which the mobile bodies 100 are connected lie substantially perpendicularly to the other actuators 88 and the air balancers 90, and extend substantially horizontally.

One of the mobile bodies 100 which is disposed on the actuator 88 extending between the upstanding air balancers 90 is connected to another actuator 88, to which there is connected the electric actuator 10 with a mechanical hand 114 connected to its distal end.

The first section 82 and the second section 84 are joined to each other by actuators 88 that are connected to each other in their longitudinal direction, and the positioning cylinders 108 are coupled to the mobile bodies 100 on these actuators 88. Each of these positioning cylinders 108 may be replaced with the electric actuator 10.

A pair of belt conveyors 116 is connected to the first section 82, and a programming keyboard 118 serving as an input/output device of a control system is disposed at the junction between the belt conveyors 116 and the first section 82. The programming keyboard 118 is detachably attached to adjacent columnar members 86, and allows the control system to control various devices incorporated in the structural assembly 80, e.g., the actuators 88 including the electric actuator 10, the air balancers 90, the cylinders 108, the mechanical hand 114, and the belt conveyors 116.

The control system includes various controllers, processors, circuits for transmitting various signals including optical signals, electric signals, fluid pressure signals, etc., and circuits for transmitting and receiving radio signals, which are housed in the actuators 88 and the columnar members 86.

The electric actuator according to the present invention offers the following advantages:

The electric actuator prevents dust and dirt particles outside of the actuator housing from being deposited on the rotational drive power transmitting means for transmitting the rotational drive power from the rotational drive power source to the displacing means.

Consequently, any resistance to the sliding movement of the rotational drive power transmitting means with respect to the displacing means is not increased by dust and dirt particles which would otherwise be deposited on the rotational drive power transmitting means. The rotational drive power transmitting means is capable of smoothly transmitting the rotational drive power from the rotational drive power source to the displacing means.

Although certain preferred embodiments of the present invention have been shown and described in detail, it should be understood that various changes and modifications may be made therein without departing from the scope of the appended claims.

What is claimed is:

1. An electric actuator comprising:
   a hollow actuator housing;
   an electric rotational drive power source connected to said hollow actuator housing, said electric rotational drive power source having a drive shaft;
   rotational drive power transmitting means comprising a feed screw shaft coupled to said drive shaft of the electric rotational drive power source, for transmitting rotational drive power from said electric rotational drive power source; and
   displacing means comprising a spline tube having a plurality of splines extending axially substantially from one end to another end of said spline tube, said spline tube being disposed in said hollow actuator housing in surrounding relationship to said rotational drive power transmitting means and held in engagement with said rotational drive power transmitting means, for displacement axially with respect to said hollow actuator housing with the rotational drive power transmitted by said rotational drive power transmitting means.

2. An electric actuator according to claim 1, wherein said rotational drive power transmitting means is integrally formed coaxially with said drive shaft of the electric rotational drive power source.

3. An electric actuator according to claim 1, further comprising a drive power transmitting medium, wherein said rotational drive power transmitting means is coupled parallel to said drive shaft of the rotational drive power source through said drive power transmitting medium, said drive power transmitting medium comprising a timing belt trained around pulleys mounted respectively on said rotational drive power source and said displacing means.

4. An electric actuator according to claim 1, further comprising a sensor disposed in said hollow actuator housing for detecting return of said displacing means to an original position thereof.

5. An electric actuator according to claim 1, wherein said rotational drive power transmitting means is coupled in series to said drive shaft of the electric rotational drive power source, said spline tube being threaded over said feed screw shaft for displacement axially along said feed screw shaft upon rotation of the feed screw shaft.

6. An electric actuator according to claim 5, further comprising a boss fastened to said hollow actuator housing, wherein said spline tube has a plurality of grooves defined between said splines on an outer circumferential surface thereof, said boss engaging in said grooves for preventing said spline tube from being rotated around said feed screw shaft.

7. An electric actuator according to claim 5, further comprising a brake mechanism mounted on an end of said feed screw shaft for braking the feed screw shaft against rotation.

8. An electric actuator according to claim 5, further comprising a damper mounted on an end of said spline tube for dampening shocks at a stroke end position of the spline tube and guiding the spline tube for displacement axially along said feed screw shaft.

9. An electric actuator according to claim 8, further comprising a ring-shaped magnet fitted over said damper.

10. An electric actuator according to claim 1, wherein said hollow actuator housing has four side surfaces each having two grooves defined therein and extending axially thereof, each of said two grooves comprising an actuator mounting slot of a substantially T-shaped cross section for mounting the electric actuator on a member, and a sensor attachment slot of a substantially arcuate cross section contiguous to the actuator mounting slot.

* * * * *